Dec. 27, 1966    J. R. MADDEN ET AL    3,294,278

FUEL TANK ANTI-SLOSH DEVICE

Filed Oct. 20, 1964

INVENTORS
Joshua R. Madden &
BY Thomas R. Cassel

S. G. Hope

ATTORNEY

United States Patent Office 3,294,278
Patented Dec. 27, 1966

3,294,278
FUEL TANK ANTI-SLOSH DEVICE
Joshua R. Madden, Rochester, and Thomas R. Cassel, Birmingham, Mich., assignors to General Motors Corporation, Detroit, Mich., a corporation of Delaware
Filed Oct. 20, 1964, Ser. No. 405,029
4 Claims. (Cl. 220—93)

This invention relates to tanks for transporting liquids, such as fuel tanks for vehicles and the like, and particularly to improvements therein for reducing sloshing and resultant noise incident to tank movements.

It is the principal object of the invention to provide an improved tank for transporting liquids through incorporation therein of a soft flexible sheet which is arranged to float upon the surface of the liquid in a manner to cushion and damp forces transmitted to the tank walls by sloshing movements of the liquid occurring in response to accelerated movements of the tank. In its more specific form, the invention is directed to improving automotive vehicle fuel tanks of the type constructed of complementary sheet material stampings, by the incorporation therein of a soft flexible sheet of such material which is secured at one side edge to an adjacent wall of the tank and extends therefore in adjacent but spaced relation to the other side walls of the tank so as to have freedom to rise and fall with changes in fuel level therein.

The invention will be more clearly understood from the following description, having reference to the drawing, wherein.

Figure 1:
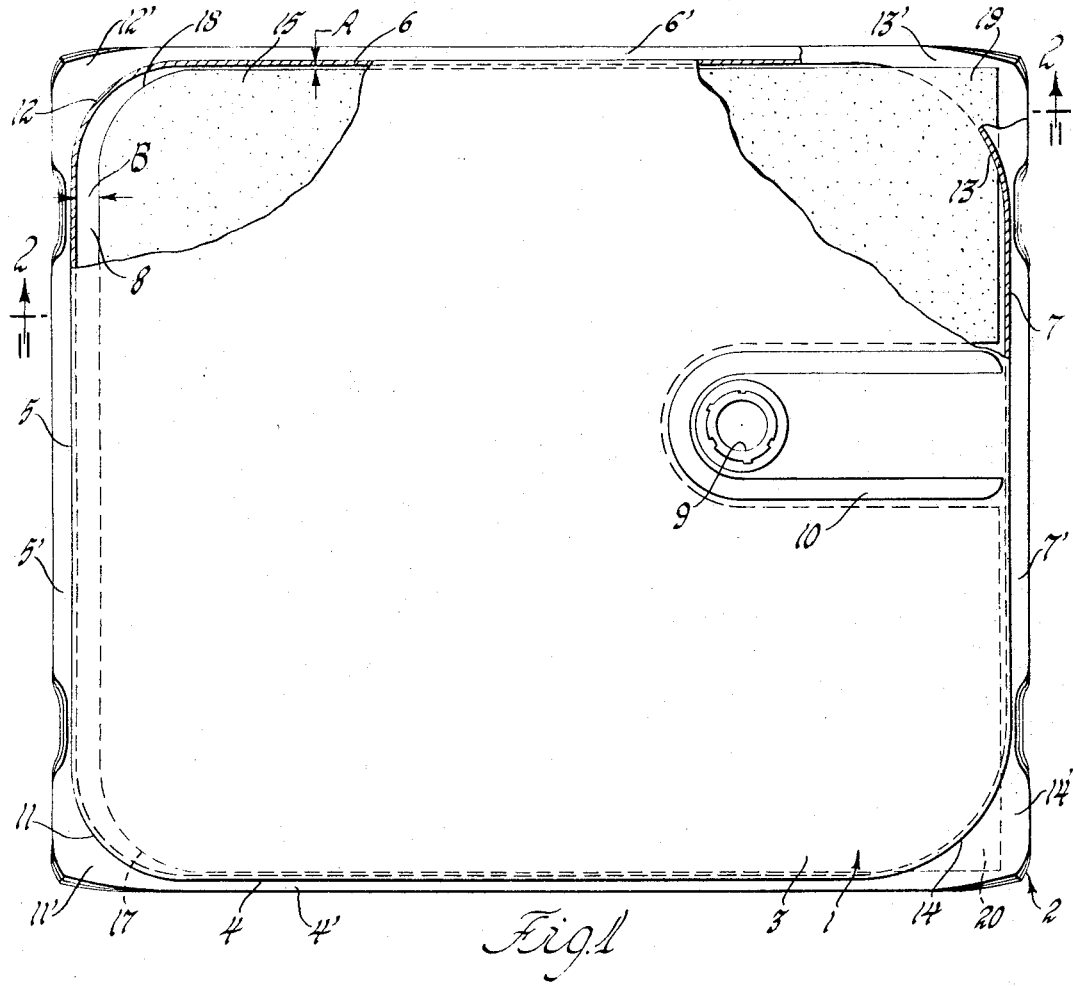
FIGURE 1 is a plan view of an automotive vehicle fuel tank embodying our anti-slosh device, with portions broken away and shown in section to better illustrate the cushioning sheet and its preferred means of securement in the tank.
Figure 2:
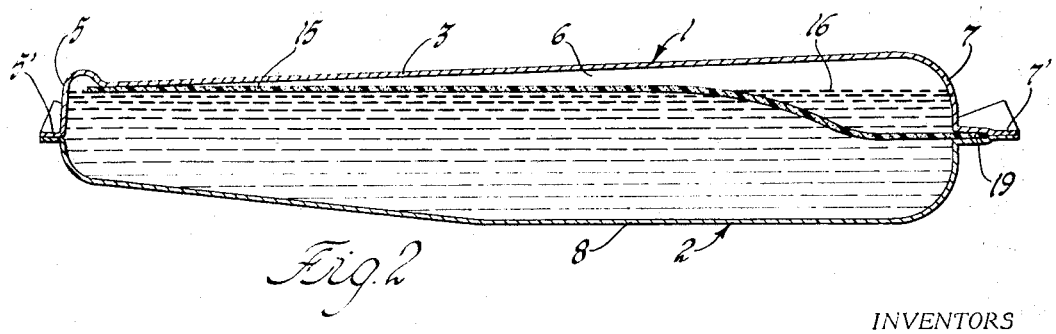
FIGURE 2 is a transverse sectional view, taken substantially along the line 2—2 of FIGURE 1.

Referring now in detail to the drawing, the tank proper consists of complementary upper and lower sections, shown in the form of sheet metal stampings 1 and 2. The upper section comprises a generally horizontal top wall 3 having side walls 4, 5, 6 and 7 extending generally normal thereto and terminating in out-turned flanges 4', 5', 6' and 7'. Similarly the lower section 2 comprises a bottom wall 8 with side walls extending upwardly therefrom and terminating in out-turned flanges abutting the flanges 4'–7' of the upper section. These flanges form the edge portions of the respective side walls and are sealingly secured together by any suitable means such as soldering or welding (not shown). Such a tank is designed to be transported in a generally horizontal position, as by mounting to the frame or underbody (not shown) of an automotive vehicle. As is conventional for such use, an opening 9 is provided in the top wall 3 for insertion of a fuel level gauge unit. The later requires space for operation of its float mechanism, etc. (not shown) within the area outlined by the embossment 10 shown in FIGURE 1. Also as is conventional in automotive vehicle fuel tanks, adjacent side walls (4 and 5, 5 and 6, etc.) merge with each other at their adjoining ends so as to form a generally rounded corner as shown at 11, 12, 13 and 14, respectively. Such rounding effects a widening of the abutting flanges in the areas 11', 12', 13' and 14' locally of these corners.

Disposed within the tank so as to lie between the top and bottom walls 3, 8, is a sheet 15 of soft flexible material which is adapted to float upon the surface of the fuel (or other liquid) 16 contained within the tank, and to cushion noise which would otherwise result from impacts of the fuel against the top and upper side walls of the tank incident to sloshing movements of the fuel during vehicle operation. In addition to its sound deadening characteristics, the material of this sheet must be selected to be chemically inert to the hydrocarbon fuel or other liquid to be carried in the tank, and to be sufficiently light in weight so as to float on the surface of the fuel therein. It will be appreciated that various materials may be used therefor, one example being polyethylene sponge (extruded) having a thickness in the order of ¼ inch. Preferably the sheet 16 is of such length and width as to fit loosely between the internal side wall surfaces of the tank, leaving a small amount of clearance such as shown at A with the side walls 4, 6 and 7, and possibly somewhat greater clearance as shown at B with the side wall 5. Two of the corners 17 and 18 of the sheet are shown rounded to provide clearance with the rounded corners 11 and 12 of the tank. The opposite corners 19 and 20 of the sheet, however, are preferably left substantially square cut as shown, and these are secured to the tank, as by clamping them between the widened corner flange portions 13' and 14'. By thus securing one marginal edge of the sheet at such spaced-apart points to the tank, proper positioning of the sheet so as to rise and fall with change in level of the fuel surface is obtained.

As will be appreciated from the foregoing, the cushioning sheet 15 is free to flex in response to sloshing movements of the fuel during vehicle operation, and in doing so remains interposed between the surface of the fuel and the top wall of the tank for minimizing impact forces transmitted to the latter by such fuel movements, and noise incident thereto.

It is appreciated that changes in the various parts and their arrangement from that described will readily suggest themselves to those skilled in the art, without departing from the spirit and scope of the invention as hereinafter claimed.

We claim:

1. In a vehicle fuel tank comprising generally rectangular upper and lower sheet metal stampings, each defining one generally horizontal wall with side walls extending generally normal thereto and terminating in outwardly extending flanges sealingly abutting the corresponding flanges of the opposite stamping, the adjacent side walls of each said stamping merging with each other to define a generally rounded corner and a resultant widening of its flange in the area locally of said corner, and a sheet of soft flexible material disposed within said tank, said material being chemically inert to and of lower specific weight than liquid hydrocarbon fuels, said sheet being of slightly less width and length than the corresponding internal length and width of the tank and having one edge thereof clamped between two adjacent widened corner flanges of said stampings, the remainder of said sheet being free to flex with change in level of the fuel and thereby cushion noise incident to fuel sloshing within the tank during vehicle operation.

2. In a vehicle fuel tank comprising an upper section defining the top and upper side walls and a complementary lower section defining the bottom and lower side walls of the tank, said sections having adjoining edge portions secured together in leak-proof relation, said top and bottom walls having interposed therebetween a sheet of soft flexible material which is chemically inert to and of lower specific gravity than liquid hydrocarbon fuels, whereby said sheet will float on the surface of such a fuel contained in the tank, said sheet having one of its lateral extremities secured between said edge portions at one side of the tank and extending therefrom in adjacent but spaced relation to the other side walls of the tank, whereby sloshing of the fuel within the tank and its resultant noise during vehicle movement is reduced.

3. A fuel tank for automotive vehicles and the like comprising complementary sections forming top, bottom and side walls in leak-tight relation, and a sheet of soft flexible material which is chemically inert to and of lower specific weight than liquid hydrocarbon fuels, said sheet being disposed within the tank to float upon the surface of such a fuel contained therein and being slightly smaller in lateral extent than that of the interior of said tank, and means fixing spaced-apart portions along one marginal edge of said sheet to the adjacent lateral extremities of the tank, whereby the remainder of said sheet may flex with change in level of the fuel and cushion noise incident to fuel sloshing within the tank during vehicle operation.

4. In a vehicle fuel tank comprising top, bottom and side walls, a sheet of soft flexible material disposed therein to lie between said top and bottom walls, said sheet having one of its lateral extremities secured to the tank adjacent one side wall thereof and extending therefrom in adjacent but spaced relation to the other side walls of the tank, said material of the sheet being chemically inert to and of lower specific weight than liquid hydrocarbon fuels, whereby said sheet will float on the surface of such fuel contained in the tank and tend to reduce fuel sloshing therein during vehicle movement and cushion noise incident thereto.

References Cited by the Examiner

UNITED STATES PATENTS

| | | | |
|---|---|---|---|
| 2,180,185 | 11/1939 | Weiss | 220—72 |
| 2,220,190 | 11/1940 | Wolf | 220—22 |
| 2,840,259 | 6/1958 | Steidl | 220—22 |
| 2,907,627 | 10/1959 | Cummings | 220—26 |
| 3,049,261 | 8/1962 | Wade et al. | 220—26 |

FOREIGN PATENTS 743,640  12/1944  Germany.

LOUIS G. MANCENE, *Primary Examiner.*

RAPHAEL H. SCHWARTZ, THERON E. CONDON,
*Examiners.*